United States Patent
Rajnayak et al.

(10) Patent No.: US 11,928,124 B2
(45) Date of Patent: Mar. 12, 2024

(54) ARTIFICIAL INTELLIGENCE (AI) BASED DATA PROCESSING

(71) Applicant: ACCENTURE GLOBAL SOLUTIONS LIMITED, Dublin (IE)

(72) Inventors: Mamta Aggarwal Rajnayak, New Delhi (IN); Govindarajan Jothikumar, Bangalore (IN); Rajat Agarwal, Bangalore (IN); Prateek Jain, Delhi (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 178 days.

(21) Appl. No.: 17/393,083

(22) Filed: Aug. 3, 2021

(65) Prior Publication Data
US 2023/0039828 A1   Feb. 9, 2023

(51) Int. Cl.
*G06F 16/25*   (2019.01)
*G06N 20/00*   (2019.01)

(52) U.S. Cl.
CPC ........... *G06F 16/254* (2019.01); *G06N 20/00* (2019.01)

(58) Field of Classification Search
CPC .............................. G06F 16/254; G06N 20/00
USPC ......................................................... 707/602
See application file for complete search history.

(56) References Cited

U.S. PATENT DOCUMENTS

| | | | | |
|---|---|---|---|---|
| 2014/0236875 A1* | 8/2014 | Phillipps | ............ | G06Q 30/0202 706/12 |
| 2018/0018590 A1* | 1/2018 | Szeto | ..................... | G06N 20/10 |
| 2019/0121673 A1* | 4/2019 | Gold | ........................ | G06N 3/08 |
| 2020/0111096 A1* | 4/2020 | Liu | .......................... | H04L 67/55 |
| 2020/0285997 A1* | 9/2020 | Bhattacharyya | ......... | G06N 7/00 |
| 2021/0027182 A1* | 1/2021 | Harris | ..................... | G06N 20/20 |
| 2021/0089934 A1* | 3/2021 | Thornley | ............. | G06F 40/216 |
| 2021/0279633 A1* | 9/2021 | Derany | ..................... | G06N 5/04 |
| 2021/0352460 A1* | 11/2021 | Rohde | ..................... | G06F 40/42 |

OTHER PUBLICATIONS

Esat Erkec, "How to use parallel insert in SQL Server 2016 to improve query performance", Dec. 8, 2017, 13 pages. <https://www.sqlshack.com/use-parallel-insert-sql-server-2016-improve-query-performance/>.
Anonymous, "Using Parallel Execution", Jul. 10, 2015, 61 pages.

* cited by examiner

*Primary Examiner* — Hosain T Alam
*Assistant Examiner* — Saba Ahmed
(74) *Attorney, Agent, or Firm* — Mannava & Kang, P.C.

(57) ABSTRACT

An Artificial Intelligence (AI)-based data processing system processes current data to determine if the quality of the current data is adequate to be provided to data consumers and if the quality is adequate, the current data is further analyzed to determine if an impacted load including changes to dimension data of the current data or an incremental load including changes to fact data of the current data is to be provided to the data consumers. Depending on the amount of data to be provided to the data consumers, processing units (PUs) may be determined and assigned to carry out the data upload. Various machine learning (ML) models that are used to provide predictions from the current data are analyzed to determine the quality of predictions and if needed, can be automatically retrained by the data processing system.

17 Claims, 11 Drawing Sheets

ARTIFICIAL INTELLIGENCE (AI) BASED DATA PROCESSING

BACKGROUND

In a field dominated by big data and analytics, data marts enable efficiently transforming information into insights. Data warehouses typically deal with large data sets, but data analysis requires easy-to-find and readily available data. Generally, complex queries need to be performed in data warehouses just to access the data needed for the reports. Data marts are used as alternatives to address such challenges. A data mart is a subject-oriented database that is often a partitioned segment of an enterprise data warehouse. The subset of data held in a data mart typically aligns with a particular unit like manufacturing, sales, etc. Data marts can accelerate processes by allowing access to relevant information in a data warehouse within a shorter time and hence form a cost-effective way to gain actionable insights quickly. Transferring data from the source database(s) to one or more destination database(s)/datawarehouse involves the Extract Transform Load (ETL) process which takes care of each movement and processing of data to load the data in an integrated form to the destination database/data warehouse.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based data processing system that enables determining the accuracy of data to be uploaded to data consumers and optimizes the resources to be used for the data uploads is disclosed. This intelligent system helps to setup an engine that build intelligent data processing framework with an inherent capability to optimize the data quality scores of different data lifecycle management stages that includes ETL & datamarts which use high computing resources. When current data to be uploaded to one or more data consumers is received from one or more data sources, the data processing system initially preprocesses the current data to identify null values, duplicate values, the distribution system, etc. The current data can include different categories of data such as but not limited to, dimensions data, facts data, external factors, and seasonal data. The facts data can include, for example, data regarding the transactions, the dimensions data can include reference data associated with the transactions, the external factors can include data regarding outside facts that affect the transactions such as political upheavals, pandemics, wars, etc. and the seasonal data can include periodic data regarding summer holidays or winter holiday season, national holidays, traditional long weekends, etc. The effect of different categories of data can be factored into the current data via different rules. The current data thus preprocessed with the rules is partitioned into a plurality of partitions wherein each of the data partitions is processed by a corresponding anomaly model to identify and isolate anomalies and generate corresponding treated data.

Different features are extracted from the treated data and the treated data can be aggregated based on aggregated criteria including Key Performance Indicators (KPIs) such as but not limited to, monthly/quarterly/weekly KPIs for seasonality, product level KPIs, site-level KPIs, etc. The features can be used as multiple model input parameters for different machine learning (ML) models trained for particular data analysis/processing that form a prediction models ensemble. The ML models are used to process the aggregated data to generate various predictions. The predictions generated by the ML models from the prediction models ensemble are compared with the actual data and real-time patterns are obtained. In an example, change in the current data as compared to the historical data can be obtained from the real-time patterns. In an example, if the comparison with the historical data shows that the current data is incorrect e.g., if chunks of data are missing or too many anomalies are included in the current data, then the data loading process is aborted and alerts regarding the failure to upload the current data are transmitted to the concerned personnel. For example, if there are differences in the dimensions data, then interactions between the facts data and dimension data are identified to locate the changes or the impacted data. An intermediate load table is generated to include details of only the impacted data which is to be loaded to the data consumers. If, however, there are only changes in the facts data, then it can be determined that only the incremental load is to be transmitted to the data consumers. Depending on the amount of data i.e., resources can be assigned. In an example, a resource requirement calculation can be used to determine the resources needed for uploading the data. In an example, the resources needed may be determined in terms of the number of processing units (PUs) required for the data upload which is obtained from the resource requirement calculation. The current data is uploaded to the data consumer using the PUs as determined from the resource requirement calculation.

In an example, the errors in the predictions generated by each of the ML models from the prediction models ensemble can be recorded and accumulated over a predetermined time period. Based on the accumulated error, if it is determined that a particular ML model is continuously overpredicting or underpredicting over the prior n periods (where n is a natural number and n≥1), then such ML models can be selected for retraining. Model retraining can also be triggered if the model accuracy deteriorates by a predetermined percentage compared to the initial build accuracy or if a predetermined time has elapsed since the last update. In an example, multiple ML models (including the ML models currently being used) can be retrained and composite scores based on aggregating Mean Absolute Deviation (MAD) and Mean Absolute Percent Error (MAPE) can be obtained for predictions over multiple months. The composite scores are compared and the final model is selected and saved to the prediction models ensemble based on the cross-comparison.

The AI-based data processing system provides a technical solution to the technical problem of identifying if a given dataset is ready for data analysis that produces insights and hence may be uploaded to the data consumers. Determining the quality of data before the data transfer enables smoother functioning of downstream applications as data anomalies, duplicate data, missing data, or other errors are identified and addressed before data analysis. Furthermore, if it is determined that the data is to be uploaded, the amount of the data to be uploaded and the resources required for uploading the data also need to be determined. In cloud-based data storage, a large amount of data may need to be transferred to data consumers. Therefore, comparison of the current data and the historical data to identify if only incremental load is to be uploaded reduces the load size thereby saving processing resources. The resource requirement calculation enables determining the number of processing units (PUs) needed for the data transfer. For example, the dynamic configuration of a cloud processor helps to optimize memory utilization based on the amount of data to be processed. In addition, the accuracy of the models is maintained as the models are built and scored automatically based on the various model retraining triggering conditions. Therefore, the data processing system not only enables optimizing data transfer resources but also enables maintaining the accuracy of the prediction models without the need for human interference.

Figure 1:
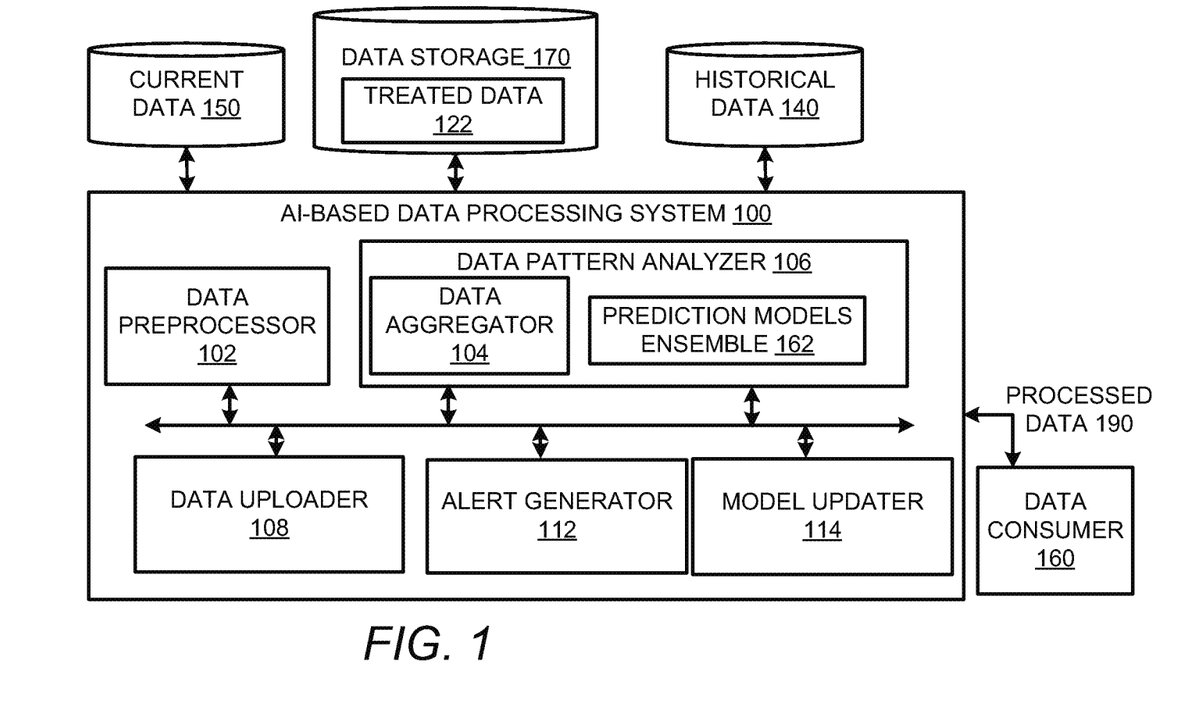
FIG. 1 shows a block diagram of an Artificial Intelligence (AI)-based data processing system in accordance with the examples disclosed herein.

FIG. 1 shows a block diagram of an AI-based data processing system 100 in accordance with the examples disclosed herein. The system 100 accesses current data 150 to be loaded to a data consumer 160, identifies if the quality of data in the current data 150 is adequate to be loaded, determines the number of processing resources to be used for loading the current data 150, and uploads at least a portion of the current data 150 i.e., the processed data 190 using the assigned processing resources. If the current data 150 is determined to be of insufficient quality, an alert may be generated and upload of the current data 150 to the data consumer 160 is aborted. The quality of the current data 150 is determined based on the comparison of the current data 150 with historical data 140 that was previously provided to the data consumer 160 in one or more uploads. The current data 150 and the historical data 140 can include different types of data such as current/historical facts data, current/historical dimensions data in addition to external factors, and seasonal data. The facts data may include data pertaining to primary entities such as transactions, spends, etc., while the dimensions data may include data that is to be referenced for the analysis of the facts data. The dimensions data may include products, sites, accounts, customer cards, etc. The seasonal data may include date/time data, data regarding holidays, monthly/weekly/daily historical key performance indicators (KPIs) while the external data may include, data regarding external factors such as campaigns, competitor pricings, pandemics, etc. that may influence the primary entities. By way of illustration and not limitation, the data consumer 160 may be another database or another application such as a dashboard that consumes the current data 150 processed by the system 100 to execute corresponding functions.

The system 100 includes a data preprocessor 102, a data pattern analyzer 106 including a data aggregator 104 and a prediction models ensemble 162, a data uploader 108, an alert generator 112, and a model updater 114. The data preprocessor 102 can access the current data 150 and split the current data 150 into partitions. The data preprocessor 102 analyzes the partitions for various dataset attributes such as null values, distribution parameters, anomalies, etc. by applying rules to determine the nature of the current data. The data preprocessor 102 may therefore determine data distribution, de-duplicate, execute a date check, generate reference mappings between the facts data and the dimensions data, identify anomalies such as null quantities or other dimensions on valid entities, and identify missing entities e.g., missing transactions, etc. The anomalies can be flagged for review and validation by human reviewers. In an example, data can be rolled up at different levels, such as customer, transaction, day level, etc., a quantity such as fuel quantity may be calculated. The current data 150 is then scaled using, for example, Robust Scaler, and a Z-score is computed. A threshold is then defined and data points lying beyond the threshold are truncated. The system 100 can be coupled to a data storage 170 which can be used to store data such as, the treated data 122 and other data exchanged by the system 100 during operations.

Partitions of treated data 122 are provided to the data aggregator 104 included in the data pattern analyzer 106 for aggregating data in accordance with various aggregation criteria. The aggregation criteria may include but are not limited to different KPIs based on the dimension data, the external data, the seasonal data, etc., such as monthly/quarterly/weekly KPIs for seasonality, product level KPIs, site level KPIs, etc. In an example, the aggregated data may also be partitioned to enable parallel or batch processing. The aggregated data is provided to one of the selected models from the prediction models ensemble 162 trained to analyze the aggregated data to provide predictions. The determination regarding the quality of model outputs of the different models in the prediction models ensemble 162 (which were initially trained on the historical data 140) can be obtained based on a comparison of the model output of each model from the prediction models ensemble with the current data 150. If the patterns of the current data 150 track the patterns of a given model output then that model may be determined to be accurate.

The data uploader 108 which is configured to upload data to the data consumer 160 may either upload incremental load which includes the changed or altered facts data or the impacted data obtained from the intermediate load table as the processed data 190 to the data consumer 160. The data uploader 108 determines the resources required for the processed data upload using a resource requirement calculation based on the quantity of data to be uploaded. The data uploader 108 determines the number of processing units (PUs) required from the resource requirement calculation. The current data 150 is uploaded to the data consumer 160 using the PUs assigned by the data uploader 108 for the task.

If there are errors in the current data 150, the nature and the number of errors may be identified by the alert generator 112 to generate different types of alerts accordingly. If the alert generator 112 identifies that the data is incorrect and further processing by downstream applications/data consumer 160 should be stopped, a red alert message regarding failure to upload the current data can be generated. Error messages can be included in a log file and can be sent via email notification to different stakeholders. If the data is correct but a few irregularities are detected from the model outputs which could lead to errors in future data load or change in entity behavior is indicated, then a yellow alert may be raised but data upload may be permitted. In the event that no errors are detected, a green alert may be generated that permits loading the current data 150.

If no errors are detected, the model updater 114 can be activated to determine if any of the models in the prediction models ensemble 162 need to be updated. In an example, error analysis can be run over the outputs of each of the models in the prediction models ensemble 162 to determine if the model retraining is necessary. The model updater 114 may be configured with different triggers that automatically initiate retraining of one or more of the ensemble models under different conditions. By way of illustration and not limitation, different triggers can relate to automatic, routine retraining that is initiated periodically, or based on real-time accuracy of a given model. The model updater 114 can retrieve historical data 140 to automatically train one or more models that are identified as requiring retraining and the retrained ML model can be included in the prediction models ensemble 162 for further use.

Figure 2:
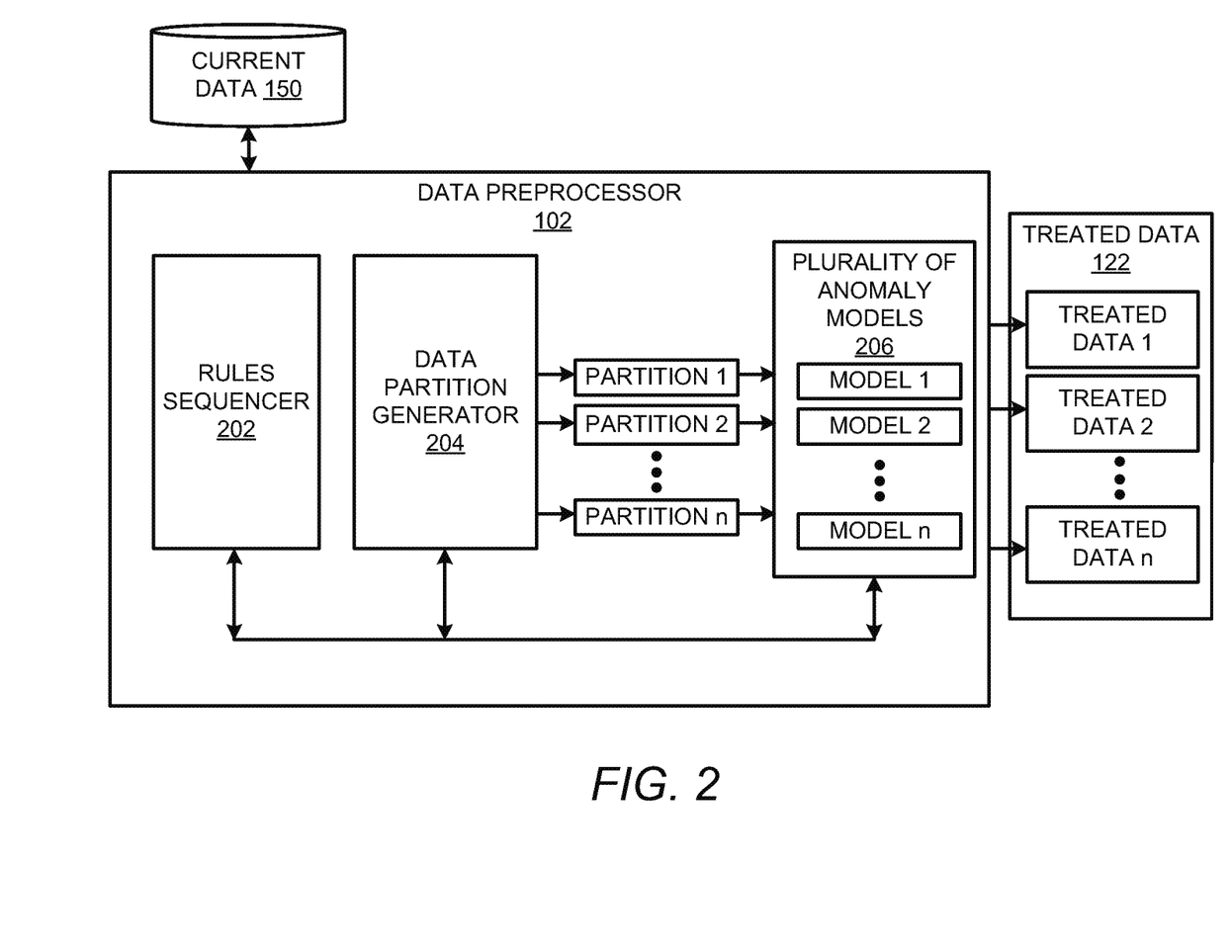
FIG. 2 shows a block diagram of a data preprocessor in accordance with some examples disclosed herein.

FIG. 2 shows a block diagram of the data preprocessor 102 in accordance with some examples disclosed herein. The data preprocessor 102 may include a rules sequencer 202, a data partition generator 204, and a plurality of anomaly models 206. The rules sequencer 202 enables cleaning data by identifying null values, determining the distribution characteristics of the current data 150, generating reference mappings between the facts data and the dimensions data, de-duplication of data records, etc. The data partition generator 204 is configured to split the current data 150 into batches or partitions, e.g., partition 1, partition 2, . . . partition n, to enable batchwise parallel processing by a plurality of anomaly models 206 e.g., model 1, model 2, . . . , model n, etc., so that multiple batches of treated data are generated. In an example, the plurality of anomaly models 206 may include Gaussian mixture models (GMMs) that adopt an unsupervised clustering approach to fit 'K' Gaussian clusters to the data and estimate distribution parameters like mean, variance, and weight of a cluster. Any anomalies that are identified from the current data 150 may be flagged for review and validation by a user. Batches of treated data including treated data 1, treated data 2, . . . , treated data n, that are each produced by a corresponding model 1, model 2, . . . model n, may be provided to the data aggregator 104 for aggregating data using different aggregation criteria.

Figure 3:
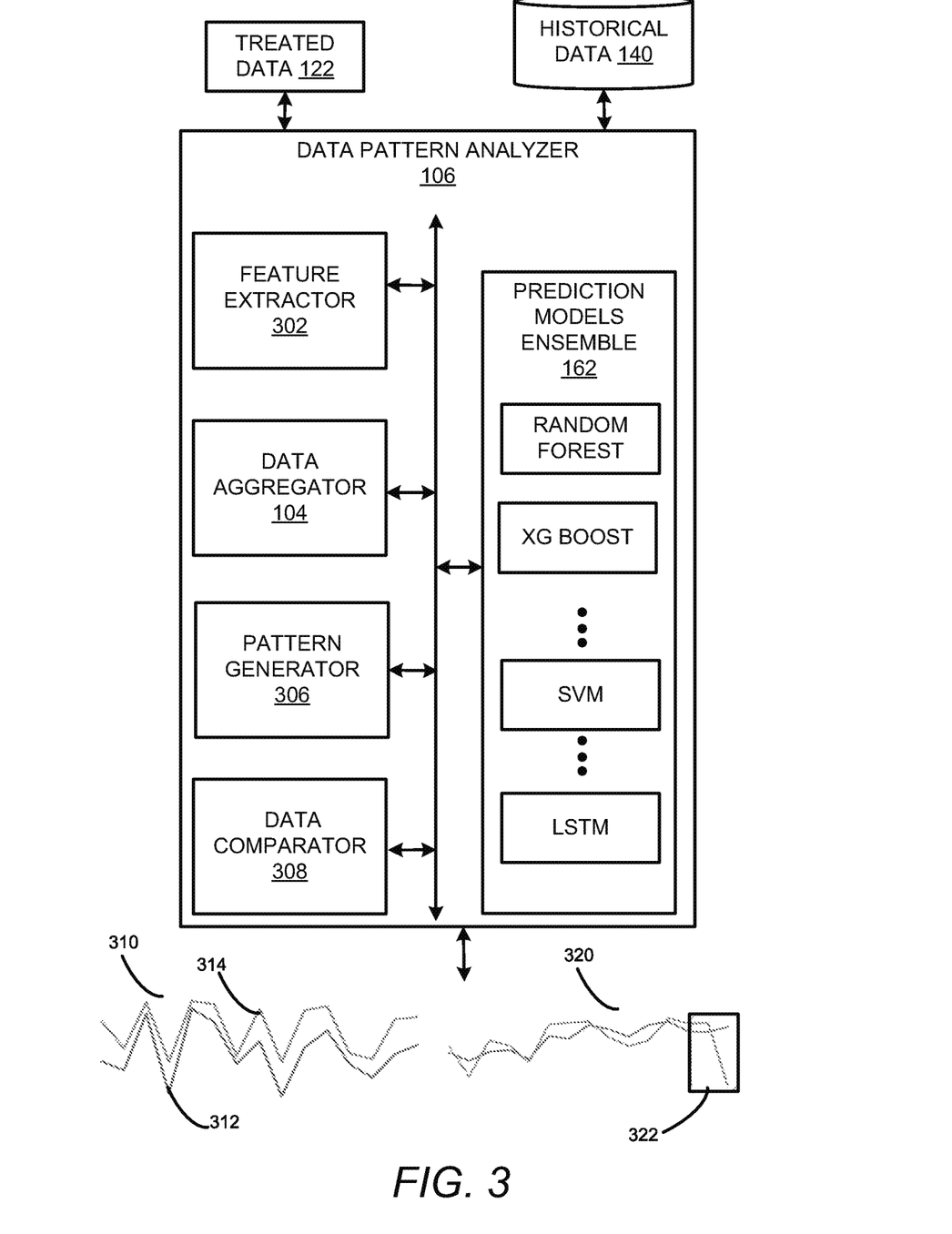
FIG. 3 shows a block diagram of a data pattern analyzer in accordance with the examples disclosed herein.

FIG. 3 shows a block diagram of the data pattern analyzer 106 in accordance with the examples disclosed herein. The data pattern analyzer 106 includes a feature extractor 302, the data aggregator 104, a pattern generator 306 along with the prediction models ensemble 162 which includes different types of prediction models based on techniques such as but not limited to, one or more of random forest, extreme gradient (XG) Boost, Support Vector Machine (SVM), Long Short Term Memory (LSTM), etc., and a data comparator 308. In an example, each of the ML models in the prediction models ensemble 162 can be initially trained to generate predictions based on features extracted from the historical data 140. During usage, the features can be extracted from the current data 150 and used for generating the predictions by one or more of the trained models in the prediction models ensemble 162.

Accordingly, the treated data 122 is processed by the feature extractor 302 to extract variables or features such as the various KPIs obtained from the dimensional data, the external data, the seasonal data, etc. For example, if the current data 150 pertains to fuel sales at different sites, the extracted features can include but are not limited to monthly, quarterly, weekday lags KPIs, campaign incremental factors on daily/product/site, the influence of holidays/weekends, etc. The data aggregator 104 employs the extracted features to aggregate or cluster data items or records from the different batches of the treated data 122. The extracted features can be provided to one of prediction models from the prediction models ensemble 162 to process different batches i.e., the treated data 1, treated data 2, . . . , treated data n in the treated data 122.

For each of the different batches, the selected prediction model can generate a real-time prediction for one of the variable values that the prediction model is trained to predict. A series of predicted variable values can be thus generated for a given batch of aggregated data by the prediction models ensemble 162. The predicted variable values can be provided to the data comparator 308 which compares the predicted variable values or feature values from the batch to the corresponding actual feature values that were recorded in the current data 150. Two example plots 310 and 320 of the output values for one of the variables/features from the data comparator 308 are shown. The variable values along with the comparisons can be provided to the data uploader 108 which determines whether or not the current data 150 can be uploaded and if it can be uploaded, the resources required for uploading the current data 150.

In the plot 310, the predicted values 314 are in line with the actual values 312, and hence, it is determined that the current data 150 has no abnormalities and hence may be loaded to the data consumer 160. Furthermore, it may also be determined that the prediction model generating the output values in the plot 310 is functioning accurately and hence does not need to be updated. Referring now to the plot 320, the data comparator 308 identifies the irregularity 322 in the comparison between the predicted values 314 and the actual values 312. Depending on the number of such irregularities the data comparator 308 may determine that the current data 150 is erroneous and needs to be further reviewed and hence is not ready for uploading to the data consumer 160 and the data upload process may be aborted with a red alert message generated by the alert generator 112. In an example, the data comparator 308 applies data quality criteria such as dynamic thresholds for determining the accuracy of the current data 150. The dynamic thresholds can include real-time accuracy from the prediction models, the benchmark cut-off points that are determined based on descriptive data, proportional differences based on lags, seasonal/external data, etc. In addition, the data comparator 308 can also provide the results of the data comparison to the model updater 114 so that any errors in the prediction model outputs can be recorded and the prediction models can be automatically updated as necessary. If there is insufficient feedback, i.e., the number of feedback collection sessions has not yet reached a predetermined number, the data uploader 108 may be configured to enable data upload.

Figure 4:
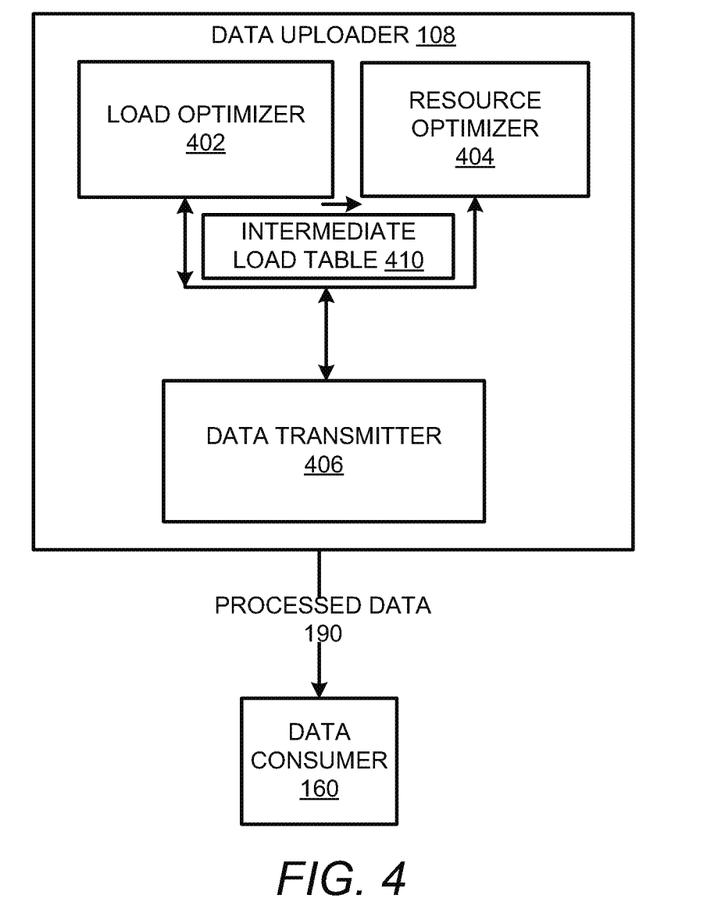
FIG. 4 shows a block diagram of a data uploader in accordance with the examples disclosed herein.

FIG. 4 shows a block diagram of the data uploader 108 in accordance with the examples disclosed herein. The data uploader 108 includes a load optimizer 402, a resource optimizer 404, and a data transmitter 406. In order to optimize the resource usage, the load optimizer 402 is configured to determine if the incremental data from the current data 150 is to be uploaded or only if the impacted data is to be uploaded based on the changes identified from the intermediate load table. If it is determined by the load optimizer 402 that the dimension data is changed, then the load optimizer 402 determines that an intermediate load table is to be generated. If the load optimizer 402 determines that only the fact data has changed, then it is further determined that the incremental load i.e., data that has changed since the last upload is to be uploaded. In an example, the load optimizer 402 generates an intermediate load table 410 to locate the changes in the fact data based on the changes in the dimension data. The intermediate load table 410 can include details of the changed accounts, transactions, etc. Data is aggregated at multiple levels for the intermediate load in which the change in a small portion of the base data can be traced back and records updated at an aggregated level.

Different configurations can be selected by the resource optimizer 404 in terms of the number of processing units (PUs) for different data volumes based on a formula/resource requirement calculation. If the entirety of the current data 150 is to be uploaded, then the resource optimizer 404 selects resources configured for a full data upload. If incremental data is to be uploaded, the resource optimizer 404 calculates the required resources based on Delta Factor (δ) which is a percentage of data to be processed vs total amount of data in the database, Load Factor (Θ) which forms a comparison of all PUs that are used and base PUs, $\mu_{full}$=number of PUs required for a full load and $\mu_{base}$=number of PUs required if there is no interaction in facts and dimension i.e., only if the incremental data to be loaded. The resource requirements are provided to the data transmitter 406 which accesses the resources accordingly and transmits or uploads the full load or the incremental load to the data consumer 160.

Figure 5:
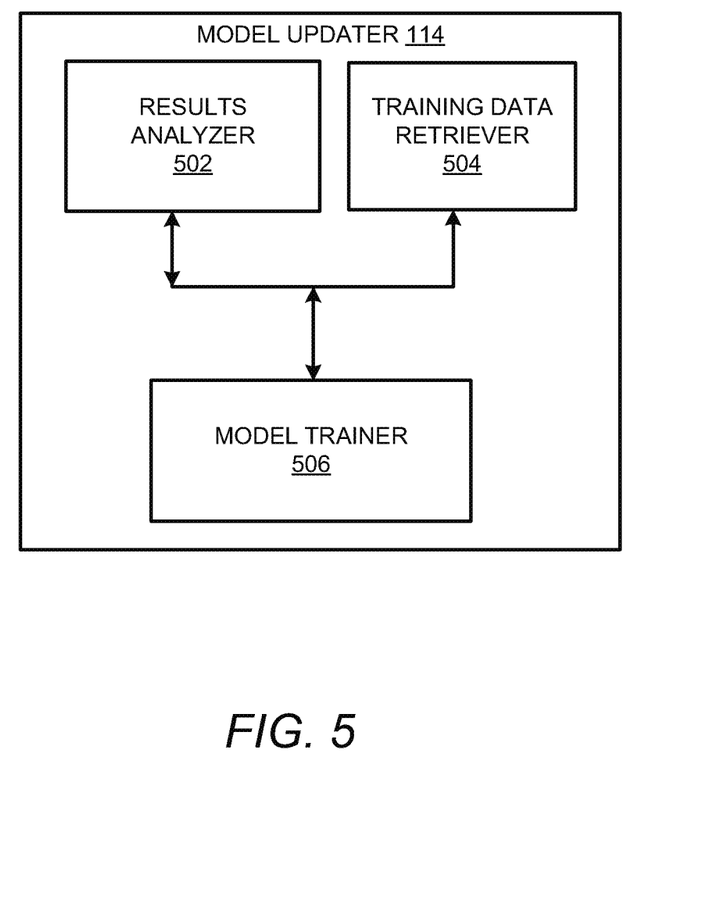
FIG. 5 shows a block diagram of a model updater in accordance with the examples disclosed herein.

FIG. 5 shows a block diagram of the model updater 114 in accordance with the examples disclosed herein. The model updater 114 includes a results analyzer 502, a training data retriever 504, and a model trainer 506. The output from the data pattern analyzer 106 is also provided to the model updater 114 as feedback regarding accuracy to determine if one or more prediction models from the prediction models ensemble 162 need to be trained. In an example, the results analyzer 502 can analyze error trends for each of the prediction models for a prior predetermined number (e.g., n where n is a natural number) of predictions and compares these predictions for the actual numbers. In case a prediction model exhibits continuous overprediction or under prediction, the results analyzer 502 can trigger retraining of the corresponding prediction models. In an example, an average accuracy over n (wherein n is a natural number and n≥1) predictions may be considered for retraining the prediction model. Thus, if the accuracy of the model is lower than the build accuracy by a predetermined threshold, then the retraining of the model may be triggered. Additionally, if a predetermined time has elapsed since the last update for one or more models, retraining of such models can be triggered.

The training data retriever 504 retrieves training data from historical data 140. The training data may also be processed by the data preprocessor 102, as described above for batch processing and removal of the data anomalies by the plurality of anomaly models 206. Again, the treated data 122 can be aggregated and provided to multiple prediction models by the model trainer 506. The outputs including predictions for a plurality of time periods e.g., multiple months are obtained at the end of the training from the multiple prediction models that received the training data. The final model is selected based on a comparison of the cross-validation results based on Mean Absolute Percentage Error (MAPE), etc. Therefore, the system 100 is configured for automatically training and replacing a prediction model based on one technique with a prediction model of another technique if it is determined that the existing model is unable to provide accurate predictions. In an example, the model trainer 506 may be configured to trigger training each of the prediction models from the prediction models ensemble 162 routinely at predetermined time periods when it is determined that sufficient time has elapsed since the particular model was last updated. In this case, the model trainer 506 may obtain the training data from the training data retriever 504 to train/update one or more of the prediction models from the prediction models ensemble 162.

Figure 6:
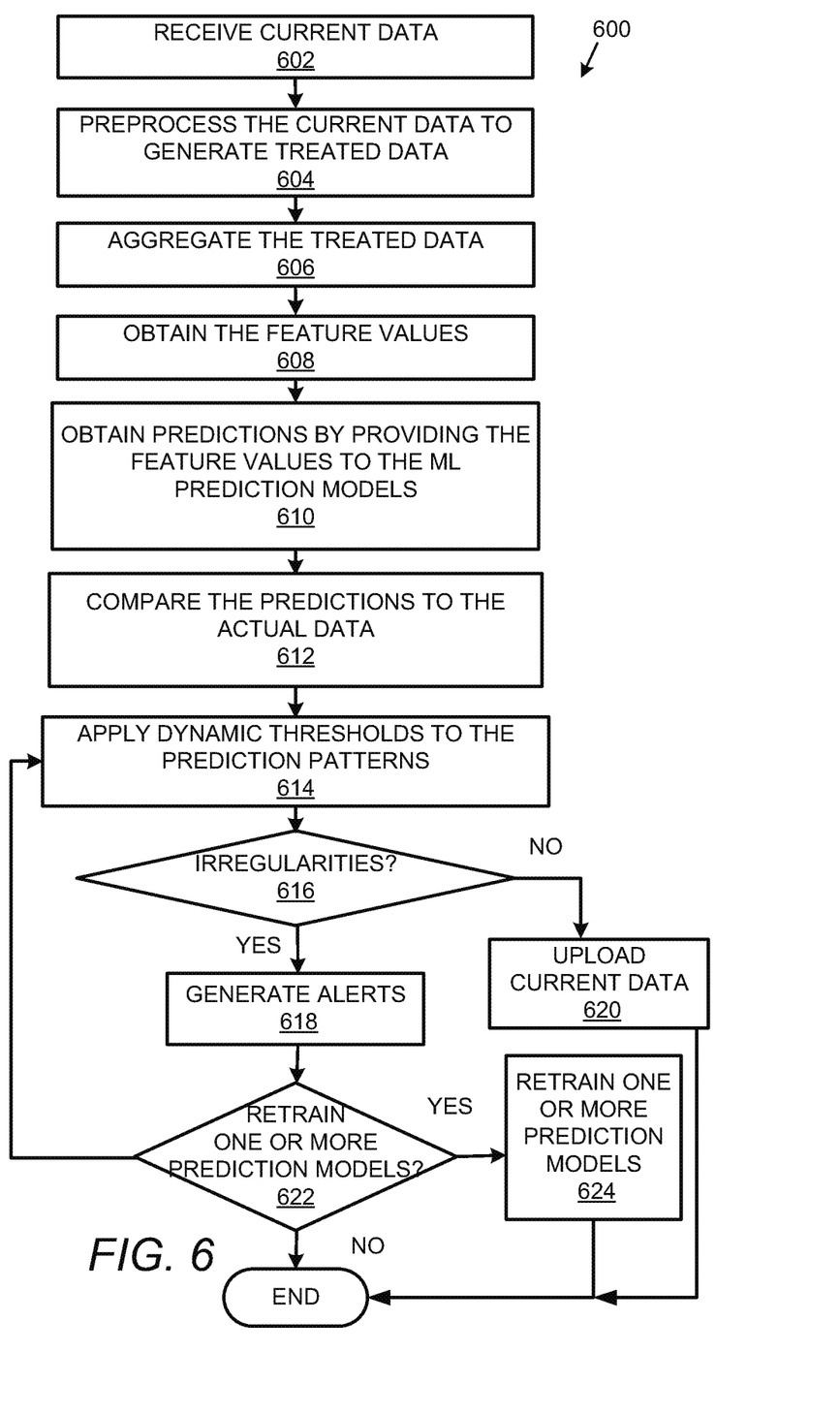
FIG. 6 shows a flowchart that details a method of processing datasets in accordance with the examples disclosed herein.

FIG. 6 shows a flowchart 600 that details a method of processing datasets to determine if the data quality is adequate for uploading to the downstream data consumers in accordance with the examples disclosed herein. The method begins at 602 wherein the current data 150 to be uploaded to the data consumer 160 is received. The data is preprocessed at 604 in accordance with certain rules to remove null values, de-duplication, etc., for the removal of anomalies and the treated data 122 is aggregated at 606 in accordance with different KPIs. The feature values are obtained at 608 for each of the batches from the current data 150. The feature values are provided at 610 to the predictions models in the prediction models ensemble 162 to obtain the predictions. In an example, the prediction models in the prediction models ensemble 162 can be initially trained on the historical data 140 to produce the corresponding predictions. The predictions are compared with the actual data/the current data 150 for each of the batches to obtain the patterns for the corresponding prediction values at 612. The dynamic thresholds are applied to the prediction patterns or the real-time patterns at 614 and it is determined at 616 if any irregularities have been uncovered. In an example, any deviation of the prediction patterns or real-time patterns from the historical patterns beyond the dynamic threshold may be identified as an irregularity. If it is determined at 616 that one or more irregularities have been identified, i.e., the deviation of a given feature/KPI exceeds the applied dynamic threshold then alerts may be generated at 618 based on the comparison of the deviation with the dynamic threshold. For example, if the difference is very high, a red alert can be generated and the current data 150 may be marked for further review and may not be uploaded to the data consumer 160. If the difference is not very high then an amber alert may be generated and the current data 150 can still be uploaded. If at 616, it is determined that the predicted values follow familiar/historical patterns, the current data 150 may be uploaded at 620 to the data consumer 160. The differences that cause the current data 150 to be uploaded or held up can be preconfigured into the system 100, for example, within the data uploader 108.

Furthermore, the errors/irregularities of the predicted values generated by the prediction models can be cumulatively analyzed over a predetermined time period by the model updater 114 to determine at 622 feedback if one or more of the prediction models generating the predictions are to be updated/retrained. If yes, the method proceeds to 624 to retrain the predictions models that need to be updated, else it terminates on the end block.

Figure 7:
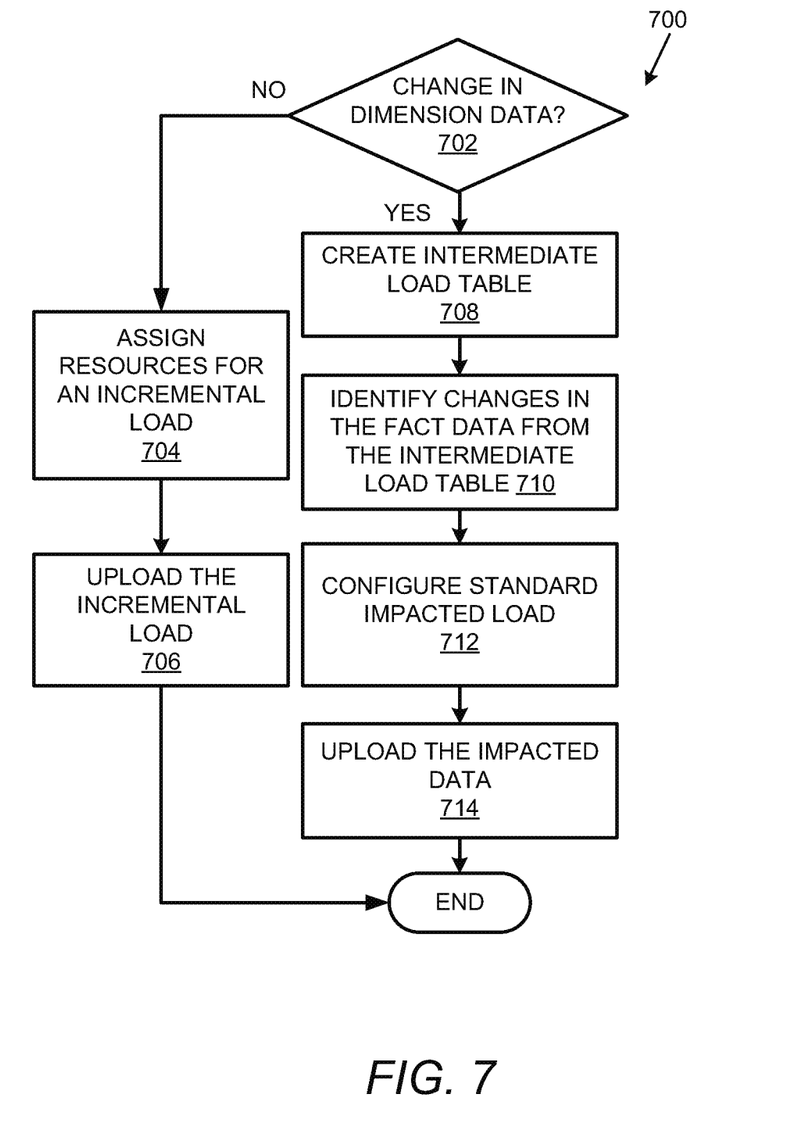
FIG. 7 shows a flowchart that details a method of uploading the current data in accordance with the examples disclosed herein.

FIG. 7 shows a flowchart 700 that details a method of uploading the current data 150 in accordance with the examples disclosed herein. The method begins at 702 wherein it is determined if there are any changes in the dimension data of the current data i.e., the current dimensions data. If it is determined that there are no changes in the current dimensions data, the method branches to 704 wherein the resources for an incremental load configuration are assigned and on the changed fact data from the current data 150 is uploaded at 706 to the data consumer 160. If it is determined at 702 that there are changes in the dimension data, an intermediate load table is created at 708 to determine the interaction of fact and dimension data. The changes in the fact data at the required level are identified at 710 from the intermediate load table. The standard resources for the impacted load are configured at 712 and the impacted data including just the updated fact data is uploaded to the data consumer 160 at 714.

As mentioned above, a resource requirement calculation is executed to determine the number of PUs for the upload. Different configurations are selected for different data volumes based on a formula for the number of PUs as given below:

$$\text{Processing Units}|PU|(i) = \begin{cases} (\mu_{base} + \theta(i) * \delta(i)) & \text{if } \mu_{base} > 0, \\ 0 & \text{if } \mu_{base} = 0 \end{cases}$$

Where i refers iteration, which varies from 1 to n (n>=1 & an integer);

$\mu_{base}$<0 is not an option $\delta(i)$(Delta Factor)=100*size of new data in the $i_{th}$ iteration/size of total data in $i_{th}$ iteration (same units)

$N_r$: is the number of rows, $N_c$: is the number of columns

The size of the data can be approximated with $N_r$ & $N_c$ with a constant factor β (which is approximately 19.4 based on empirical estimates).

$\Theta(i)$(Load Factor)=$(\mu_{full(i)}-\mu_{base(i)})$/100 where i is iteration $\mu_{full(i)}=|\mu_{full}+\Theta(i)*\delta(i)|$; $\mu_{base(i)}=|\mu_{base}+\Theta(i)*\delta(i)|$ $\mu_{base}$=number of PUs required if no there are interactions in facts and dimension data. This can be derived by performing an incremental load in sample data with no interaction. The size of the sample data is based upon the frequency at which data will be loaded. If the frequency of data load changes, then it needs to be updated.

$\mu_{full}$=number of PUs required for a full load. This needs to be derived empirically by loading full data or extrapolating from sample data. As time progresses, the total amount of data will also increase, and hence this factor can be updated using the below equation:

new$\mu_{full}$=round($\mu_{full}+\Theta*\delta$)

Figure 8:
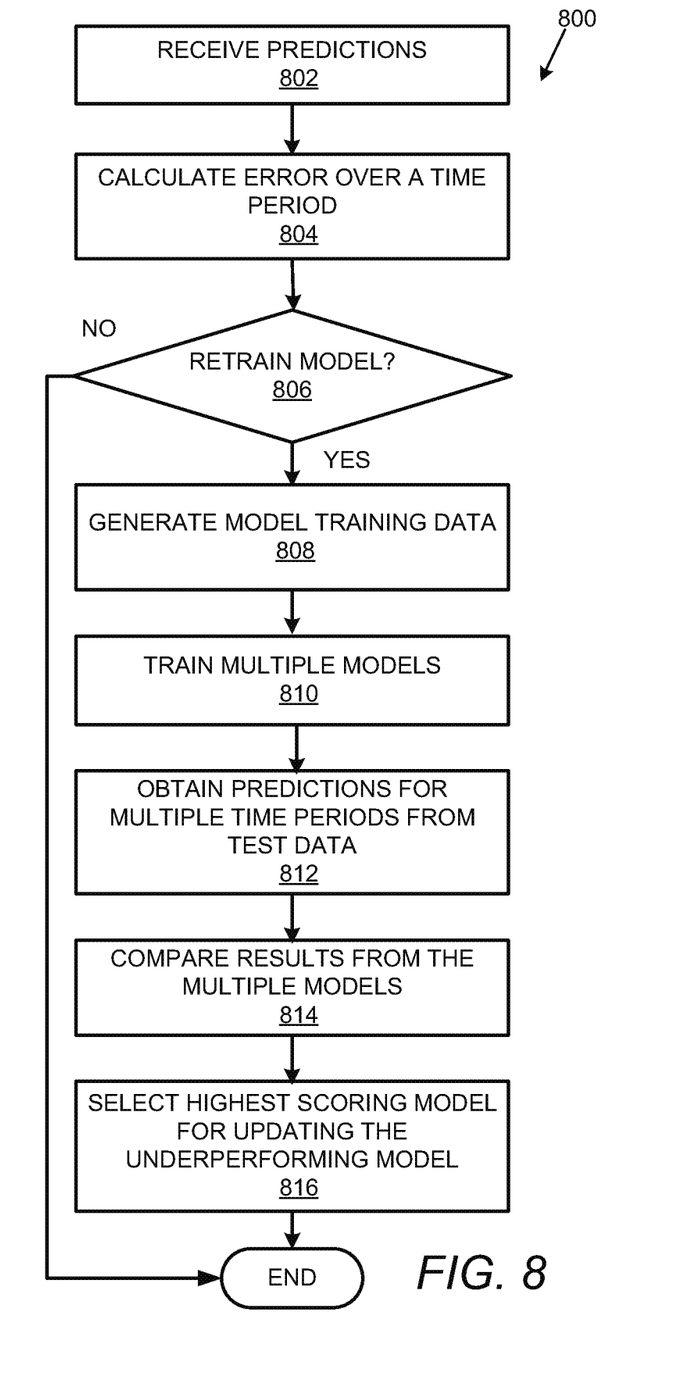
FIG. 8 shows a flowchart that details a method of automatically retraining a prediction model in accordance with the examples disclosed herein.

FIG. 8 shows a flowchart 800 that details a method of automatically retraining a prediction model in accordance with the examples disclosed herein. The method begins at 802 with receiving predictions from a prediction model for the current data 150. In an example, the ML models receive input Daily/Product/Site level KPIs and different factors affecting the KPIs as input to generate one day forecast. Multiple days predictions can be obtained by expanding the one-day predictions using a Recursive Multi-Step forecast strategy. The errors associated with the predictions are obtained at 804 over a time period e.g., over the last n predictions (where n is a positive integer and n>=1). Based on the errors collected over the time period, it is determined at 806 if the prediction model is working accurately or if the prediction model is overpredicting or underpredicting. If it is determined at 806 that the prediction model need not be retrained, i.e., there are not enough errors from the model's predictions to warrant retraining, the method terminates on the end block. If it is determined at 806 that the prediction model is to be retrained, the model training data is generated at 808 as described above, i.e., the data is preprocessed, divided into batches, anomalies are removed the data is aggregated per certain aggregation criteria. Multiple prediction models based on different techniques such as SVM, LSTM, XG Boost, etc., can be trained at 810 on the training data. In an example, the training data can be divided into a training data set and a test data set. The predictions are obtained at 812 from the multiple trained models for the test data set. In an example, a composite score can be calculated from the predictions over multiple months for each of the multiple models. The results i.e., the composite scores of the multiple models can be compared at 814. In an example, criteria such as MAPE can be used to compare the different models. The highest scoring model is selected at 816 for replacing/updating the underperforming prediction model in the prediction models ensemble 162. Below formula shows the weighted average composite score calculated for each type of KPI:

(Wt. Score)=$\Sigma_{k=0}^{n} M^k N^k /N$ where M is MAPE/Mean Absolute Deviation (MAD)/ Accuracy for each partition, and N is the number of observations for each Partition.

Figure 9:
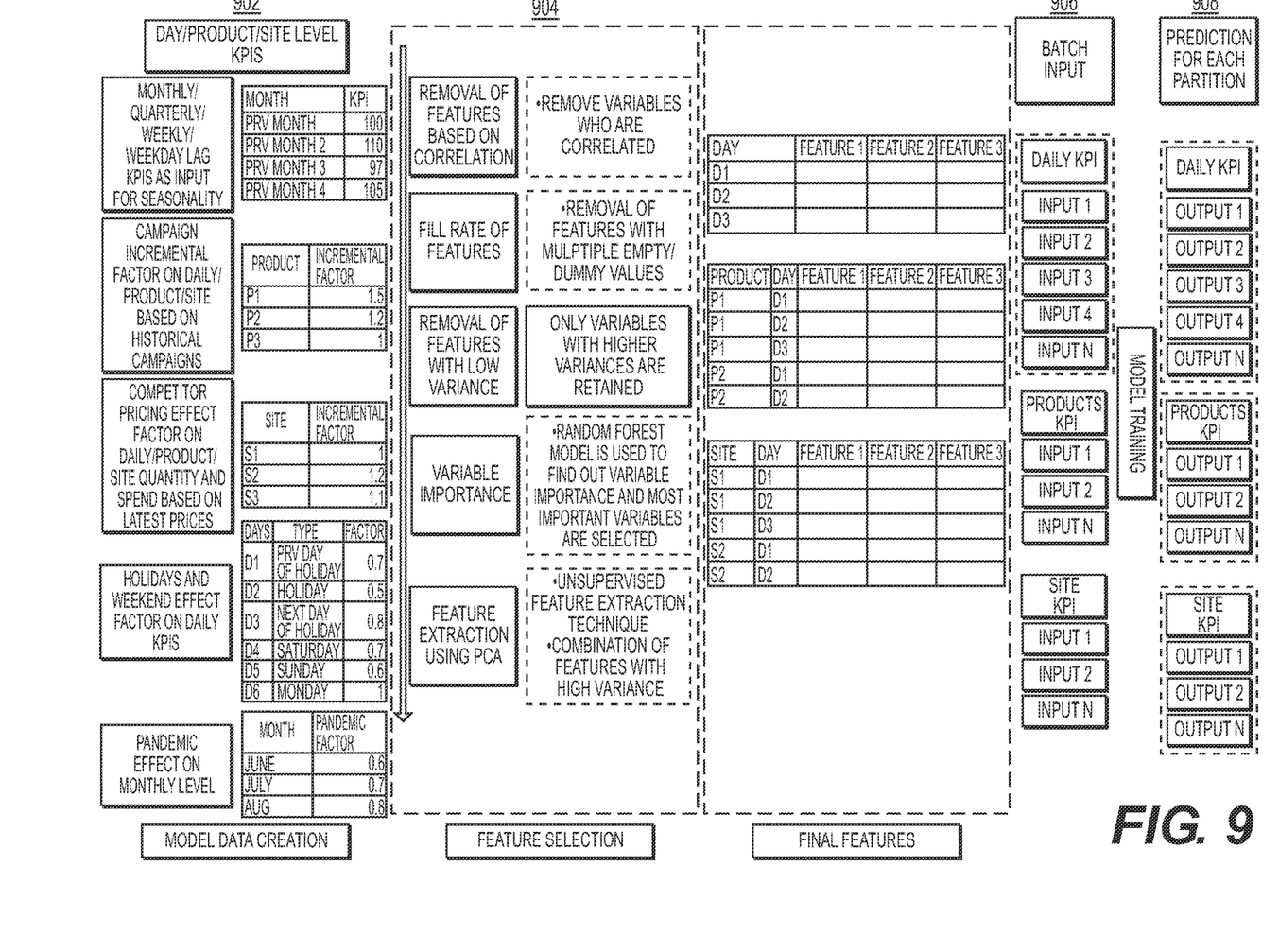
FIG. 9 shows the processing of data for training the prediction models in accordance with the examples disclosed herein.
Figure 10:
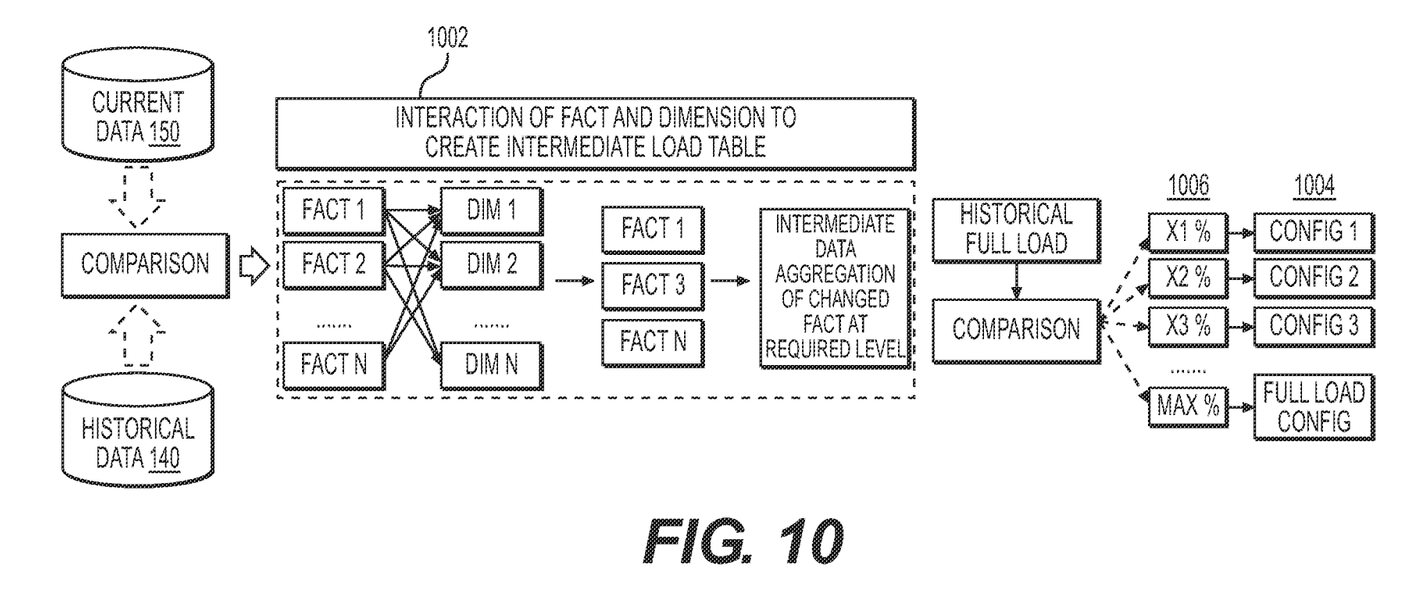
FIG. 10 shows an example of load determination and resource assignment based on the load.

FIG. 9 shows the data processing for training the prediction models by the system 100 in accordance with the examples disclosed herein. Generally the data examples referred to below pertain to the retail domain unless otherwise specified and it may be appreciated that a retail establishment use case is discussed for illustration purposes only and that the data processing techniques disclosed herein can be applied to many datasets pertaining to the domains of finance, healthcare, manufacturing, etc. Initially, the daily, product, and site level KPIs 902 are preprocessed for anomaly removals, aggregation and can be employed as model input parameters. Different rules 904 can be applied for selecting different features 902. For example, some features may be removed based on correlation, some features with multiple empty or dummy values are removed and hence features are selected based on the fill rate. Only features of higher variance are considered while features with lower variance may be eliminated. In an example, a random forest model can be used to select the most important variable/feature. Finally, features are extracted using techniques such as Principle Component Analysis (PCA) via unsupervised feature extraction so that a combination of features with high variance is selected. The final features are input as batches 906 to the prediction model(s) for training and the predictions 908 are obtained for each batch partition FIG. 10 shows an example of load determination and resource assignment based on the load. The interactions 1002 between the fact data and the dimensions data are considered to create the intermediate load table 410 which enables identifying the changes in the facts data. Again, the facts data is aggregated as described herein and only the change data in the current data 150 as compared with the historical data 140 is uploaded to the data consumer 160 thus decreasing the amount of data to be processed significantly. Any new data can be loaded using standard processes, however, a change in existing dimension data may require reloading of changed historical data. Thus, along with the new data, an optimal amount of historical data that needs to be re-processed is identified due to interactions. The volume of data to be processed varies based on the changes in the data. Static configurations of Extract Transform Load (ETL) jobs may become prone to failure if sufficient resources are not allocated, or unnecessary costs may be incurred due to over-allocation of the resources. Different configurations as shown at 1004 for different data volumes as shown at 1006 is selected based on the below mathematical formulation:

$$|PU| = \begin{cases} (\mu_{base} + \theta * \delta) & \text{if } \mu_{base} > 0, \\ 0 & \text{if } \mu_{base} = 0 \end{cases}$$

where |PU| is the number of processing units to be used for processing the current load.

Figure 11:
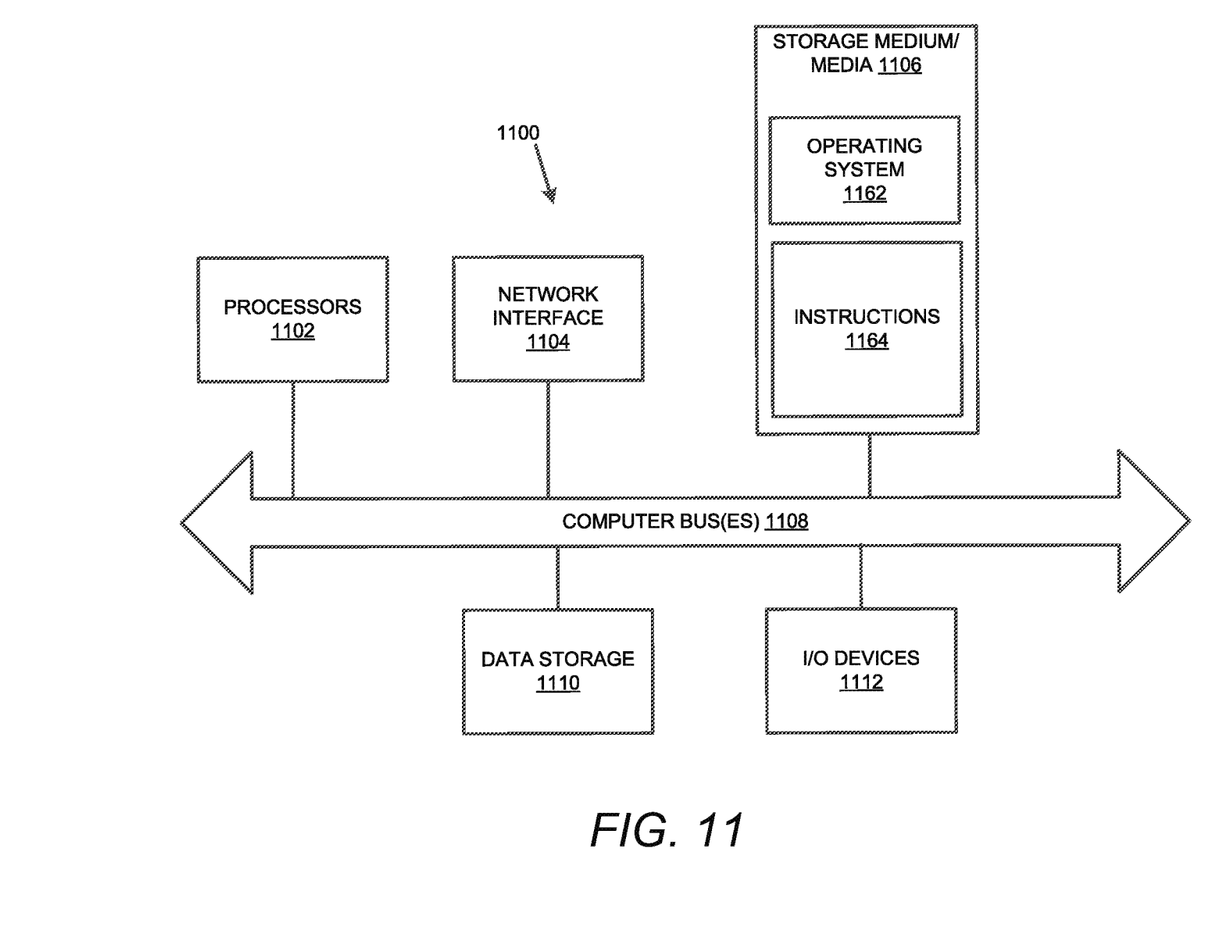
FIG. 11 illustrates a computer system that may be used to implement the data processing system in accordance with the examples disclosed herein.

FIG. 11 illustrates a computer system 1100 that may be used to implement the data processing system 100. More particularly, computing machines such as desktops, laptops, smartphones, tablets, and wearables which may be used to generate or access the data from the data processing system 100 may have the structure of the computer system 1100. The computer system 1100 may include additional components not shown and that some of the process components described may be removed and/or modified. In another example, a computer system 1100 can sit on external-cloud platforms such as Amazon Web Services, AZURE® cloud or internal corporate cloud computing clusters, or organizational computing resources, etc.

The computer system 1100 includes processor(s) 1102, such as a central processing unit, ASIC or another type of processing circuit, input/output devices 1112, such as a display, mouse keyboard, etc., a network interface 1104, such as a Local Area Network (LAN), a wireless 802.11x LAN, a 3G, 4G or 5G mobile WAN or a WiMax WAN, and a processor-readable medium 1106. Each of these components may be operatively coupled to a bus 1108. The computer-readable medium 1106 may be any suitable medium that participates in providing instructions to the processor(s) 1102 for execution. For example, the processor-readable medium 1106 may be a non-transitory or non-volatile medium, such as a magnetic disk or solid-state non-volatile memory, or a volatile medium such as RAM. The instructions or modules stored on the processor-readable medium 1106 may include machine-readable instructions 1164 executed by the processor(s) 1102 that cause the processor(s) 1102 to perform the methods and functions of the data processing system 100.

The data processing system 100 may be implemented as software or machine-readable instructions stored on a non-transitory processor-readable medium and executed by one or more processors 1102. For example, the processor-readable medium 1106 may store an operating system 1162, such as MAC OS, MS WINDOWS, UNIX, or LINUX, and code 1164 for the data processing system 100. The operating system 1162 may be multi-user, multiprocessing, multitasking, multithreading, real-time, and the like. For example, during runtime, the operating system 1162 is running and the code for the data processing system 100 is executed by the processor(s) 1102.

The computer system 1100 may include a data storage 1110, which may include non-volatile data storage. The data storage 1110 stores any data used by the data processing system 100. The data storage 1110 may be used to store the treated data 122, the processed data 190, or other data elements, which are generated and/or used during the operation of the data processing system 100.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based data processing system, comprising:
   at least one processor;
   a non-transitory processor-readable medium storing machine-readable instructions that cause the processor to:
   access current data to be loaded to a data consumer wherein the current data includes current facts data and current dimensions data which includes reference data for the current facts data;
   aggregate the current data into one or more clusters based on corresponding one or more aggregation criteria;
   obtain one or more real-time patterns as outputs from processing the aggregated data by selected one or more machine learning (ML) models of a plurality of ML models;
   determine, based on comparisons of the real-time patterns with one or more dynamic thresholds, that quality of the aggregated data permits uploading of the aggregated data to the data consumer,
   wherein an upload of the aggregated data includes,
      determining if differences exist in one or more of the current dimensions data and the current facts data in comparison with historical data,
   wherein if the differences exist within the current dimensions data,
      the upload of the aggregated data includes an upload of impacted data associated with the differences of the current facts data and the current dimensions data to the data consumer, and
   wherein if the differences exist within the current facts data,
      the upload of the aggregated data includes an upload of incremental data associated with the differences of the current facts data to the data consumer;
   determining resources needed in terms or a number of processing units for loading the aggregated data by determining different configurations for different data volumes, wherein each configuration is selected based on a number of processing units determined from a delta factor that represents a percentage of the current data to be processed vs total amount of data in a database including the current data, a load factor ⊖ which is a comparison of all the processing units and base processing units, $\mu_{full}$ that forms the number of processing units required for a full load and $\mu_{base}$ that represents the number of processing units required if there are no interactions between the current facts data and the current dimensions data; and loading the aggregated data to the data consumer using the resources including the determined number of processing units.

2. The data processing system of claim 1, wherein the processor is to further:

generate feedback regarding accuracy of the selected one or more ML models based on a weighted average of error in the output of the selected one or more ML models;

provide the feedback regarding accuracy of the selected one or more ML models based at least on the one or more real-time patterns; and automatically trigger retraining of at least one ML model of the selected one or more ML models upon receiving the feedback.

3. The data processing system of claim 2, wherein the feedback indicates that at least one of the selected one or more ML models is overpredicting or underpredicting compared to corresponding model outputs in historical data.

4. The data processing system of claim 1, wherein the dynamic thresholds include real-time accuracy of the one or more ML models.

5. The data processing system of claim 1, wherein to determine the resources needed for loading the aggregated data, the processor is to further:

build an intermediate load table that maps the current facts data with the current dimensions data; and identify based on the intermediate load table, the impacted data including the differences in the current facts data in comparison with historical facts data, and the current dimensions data in comparison with historical dimensions data.

6. The data processing system of claim 1, wherein the processor is to further:

dynamically configure a cloud processor to optimize memory utilization based on the amount of data to be uploaded, wherein the data to be uploaded includes one of the impacted data and the incremental data.

7. The data processing system of claim 1, wherein to select the one or more ML models the processor is to further:

select the one or more ML models from the plurality of ML models based on the aggregation criteria.

8. The data processing system of claim 1, wherein the plurality of ML models include support vector machines (SVMs), Random Forests, Extreme Gradient Boosting (XG Boost), and Long Short Term Memory (LSTM) models.

9. The data processing system of claim 1, wherein the processor is to further:

train the plurality of ML models for identifying the real-time patterns.

10. A method of processing data comprising:

partitioning current data to be uploaded to a data consumer wherein the current data includes current facts data and current dimensions data which includes reference data for the current facts data;

identifying anomalies in each of the partitions of the current data;

identifying multiple model input parameters by aggregating the current data at multiple levels;

obtaining predictions for corresponding variables in the current data from one or more Machine Learning (ML) models for one day forecast from the multiple model input parameters;

comparing the predictions from the one or more ML models with historical data;

determining that at least one of the one or more ML models requires to be retrained based on the comparison;

automatically retraining the at least one ML model;

aggregating the current data into one or more clusters based on corresponding one or more aggregation criteria;

obtaining one or more real-time patterns as outputs from processing the aggregated data by the automatically-retrained at least one ML model;

determining, based on comparisons of the real-time patterns with one or more dynamic thresholds, that quality of the aggregated data permits uploading of the aggregated data to the data consumer, wherein an upload of the aggregated data includes,
    determining that differences exist in the current facts data in comparison with the historical data,
    identifying that incremental data including the differences in the current facts data is to be uploaded to the data consumer,
    wherein the identification is based on comparisons of the real-time patterns generated by the automatically re-trained ML model with one or more dynamic thresholds;

calculating a number of processing units required for the upload based at least on the incremental data by determining different configurations for different data volumes, wherein each configuration is selected based on a number of processing units determined from a delta factor that represents a percentage of the current data to be processed vs total amount of data in a database including the current data, a load factor ⊖ which is a comparison of all the processing units and base processing units, $\mu_{full}$ that forms the number of processing units required for a full load and $\mu_{base}$ that represents the number of processing units required if there are no interactions between the current facts data and the current dimensions data; and uploading the incremental data to the data consumer with the processing units as assigned from the calculation.

11. The method of claim 10, wherein the multiple model input parameters include day, site, and product-level Key Performance Indicators (KPIs).

12. The method of claim 10, wherein determining that the at least one ML model requires to be retrained comprises:

analyzing error trend for last n predictions of the at least one ML model, where n is a natural number.

13. The method of claim 12, automatically retraining the at least one ML model further comprising:

automatically triggering the retraining of the at least one ML model based on at least one of:

continuous overpredicting or underpredicting over the n predictions, elapsing of a predetermined time since the at least one ML model was last updated, and deterioration of accuracy of the at least one ML model by a predetermined percentage as compared to an initial build accuracy.

14. The method of claim 10, wherein the automatic retraining of the at least one ML model includes:
   training multiple ML models including the one or more ML models;
   generating a composite score for each of the multiple ML models based on corresponding last n predictions of the ML model; and
   selecting one of the multiple ML models as a retrained ML model based on a cross-comparison between the composite scores.

15. The method of claim 10, further comprising:
   determining that insufficient feedback was received regarding model predictions of at least one of the one or more ML models.

16. A non-transitory processor-readable storage medium comprising machine-readable instructions that cause a processor to:
   partition current data to be uploaded to a data consumer wherein the current data includes current facts data and current dimensions data which includes reference data for the current facts data;
   identify anomalies in each of the partitions of the current data;
   identify multiple model input parameters by aggregating the current data at multiple levels;
   aggregate the current data into one or more clusters based on the multiple model input parameters;
   identify one or more real-time patterns from processing the aggregated data with selected one or more machine learning (ML) models of a plurality of ML models; and
   determine based on comparisons of the real-time patterns with one or more dynamic thresholds, that data quality criteria permit uploading of the aggregated data to the data consumer,
   wherein an upload of the aggregated data includes,
      determining if differences exist in one or more of the current dimensions data or the current facts data in comparison with historical data,
      wherein if the differences exist within the current dimensions data,
         the upload of the aggregated data includes an upload of impacted data associated with the differences of the current facts data and the current dimensions data to the data consumer, and
      wherein if the differences exist within the current facts data,
         the upload of the aggregated data includes an upload of incremental data
      associated with the differences of the current facts data to the data consumer;
   determining resources needed in terms or a number of processing units for loading one of the impacted load and the incremental load, wherein determining the resources includes determining different configurations for different data volumes, wherein each configuration is selected based on the number of processing units determined from a delta factor that represents a percentage of the current data to be processed vs total amount of data in a database including the current data, a load factor $\ominus$ which is a comparison of all the processing units and base processing units, $\mu_{full}$ that forms the number of processing units required for a full load and $\mu_{base}$, that represents the number of processing units required if there are no interactions between the current facts data and the current dimensions data; and
   loading one of the impacted load and the incremental load to the data consumer using the resources including the determined number of processing units.

17. The non-transitory processor-readable storage medium of claim 16, further comprising instructions that cause the processor to:
   employing a corresponding Gaussian Mixture Model (GMM) to identify the anomalies in each of the partitions of the current data; and
   determine quality of the current data based on a number of the anomalies identified from the current data.

* * * * *